United States Patent
Lee

(10) Patent No.: US 6,554,114 B2
(45) Date of Patent: Apr. 29, 2003

(54) DUAL SYNCHRONIZATION SYSTEM OF MANUAL TRANSMISSION

(75) Inventor: Jeong-Ki Lee, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/983,318

(22) Filed: Oct. 24, 2001

(65) Prior Publication Data

US 2002/0084166 A1 Jul. 4, 2002

(30) Foreign Application Priority Data

Dec. 29, 2000 (KR) .................................... 2000-85851

(51) Int. Cl.[7] ................................................. F16D 23/06
(52) U.S. Cl. ..................................... 192/53.343; 74/339
(58) Field of Search ....................... 192/53.343, 53.341, 192/53.34, 53.32; 74/339

(56) References Cited

U.S. PATENT DOCUMENTS

| | | | | |
|---|---|---|---|---|
| 2,478,355 A | * | 8/1949 | Auten ................... | 192/53.343 |
| 3,197,000 A | * | 7/1965 | Conkle .................. | 192/53.343 |
| 3,631,952 A | * | 1/1972 | Sugimoto et al. ....... | 192/53.342 |
| 4,660,707 A | * | 4/1987 | Sadanori et al. ......... | 192/53.34 |
| 4,838,399 A | * | 6/1989 | Inui ........................ | 192/53.31 |
| 5,620,075 A | * | 4/1997 | Larsen et al. ............ | 192/53.34 |
| 6,244,404 B1 | * | 6/2001 | Kim ........................ | 192/53.34 |

* cited by examiner

Primary Examiner—Saúl Rodriquez
(74) Attorney, Agent, or Firm—Birch, Stewart, Kolasch & Birch, LLP

(57) ABSTRACT

A dual synchronization system of a manual transmission constructed in the dual set of a plurality of keys to be attached to the internal side of a synchronizer sleeve by a synchronizer ring, first and second key sets being positioned apart at a predetermined degree of angle along the circumferential direction of a synchronizer ring, wherein the first key set attaching the synchronizer ring close to a clutch gear at the initiation of synchronization and the second key set pushing the synchronizer ring close to the clutch gear after the completion of synchronization, thereby continuously maintaining the frictional force between the synchronizer ring and the clutch gear to achieve stable shifting feelings.

6 Claims, 4 Drawing Sheets

DUAL SYNCHRONIZATION SYSTEM OF MANUAL TRANSMISSION

BACKGROUND OF THE INVENTION

1. Field of the Invention

The present invention relates to a synchronization system of a manual transmission, and more particularly to a dual synchronization system of a manual transmission having two sets of a plurality of keys for synchronization.

2. Brief Description of the Prior Art

In general, an automatic transmission is installed between clutch and driving axle, playing a role to change rotational force of an engine depending on a running condition of a vehicle and convey it to the driving axle and including a backward running apparatus for driving the vehicle backward.

The aforementioned transmission is largely classified into an automatic transmission that automatically changes speed and a manual transmission that a driver directly manipulates shifting levers to four levels of forward driving or a level of backward driving. Specifically, the invention relates to a dual synchronization system of the manual transmission.

FIG. 1 illustrates a synchronization system of a general manual transmission for an instance. As shown in the drawing, the synchronization system 1 includes a synchronizer sleeve 13, synchronizer spring 15, synchronizer hub 7, synchronizer key 11 and synchronizer ring 35, all of which are involved to overcome a difference in rotational speed between the synchronizer hub 7 and a clutch gear (not shown) in their connection or disconnection.

In other words, the synchronizer hub 7 and the clutch gear having different rotational speeds will be connected together in the following steps. When the synchronizer sleeve 13 slides on the synchronizer hub 7 to a rotating direction of its rotational axle, the synchronizer key 11 closely attached into the synchronizer sleeve 13 with the synchronizer spring 15 pushes the synchronizer ring 35 tightly to the clutch gear. As a result, the synchronizer ring 35 and the clutch gear offset the difference in their rotational speeds for synchronization. At this time, the synchronizer sleeve 13 further proceeds to pass the synchronizer ring 35 and meshed with the clutch gear, so as to get the synchronizer hub 7 and the clutch gear to be in their direct connection.

However, in the synchronization system 1 thus constructed, when the synchronizer sleeve 13 passes the synchronizer ring 35 and proceeds to the clutch gear after synchronization of the synchronizer ring 35, the synchronizer sleeve 13 pushes the synchronizer key 11 attached to the internal side thereof with the synchronizer spring 15 inwards and over, so that the synchronizer key 11 can no longer provide force to push the synchronizer ring 35 tightly to the clutch gear.

Therefore, at the aforementioned states, no force is involved to push the synchronizer ring 35 closely to the clutch gear while the synchronizer sleeve 13 passes the synchronizer ring 35 and meshes with the clutch gear. At this time, a breakdown of synchronization occurs to bring about a second nibble, which is a disadvantage in the conventional synchronization system.

SUMMARY OF THE INVENTION

It is an object of the present invention to solve the aforementioned problems and to provide a dual synchronization system of a manual transmission to prevent breakdown of synchronization and improve its shifting feeling of an auto vehicle.

In order to accomplish the aforementioned object of the present invention, there is provided a dual synchronization system of a manual transmission constructed with first and second key sets respectively having a plurality of keys that are positioned apart at a predetermined degree of angle along the circumferential direction of a synchronizer ring, the first key set closely attaching the synchronizer ring to a clutch gear at the initiation of synchronization and the second key set pushing the synchronizer ring to the clutch gear after the completion of synchronization, thereby continuously keeping frictional force between the synchronizer ring and the clutch gear.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Hereinafter, a preferred embodiment of the present invention will be described in detail with reference to accompanying drawings.

Figure 1:
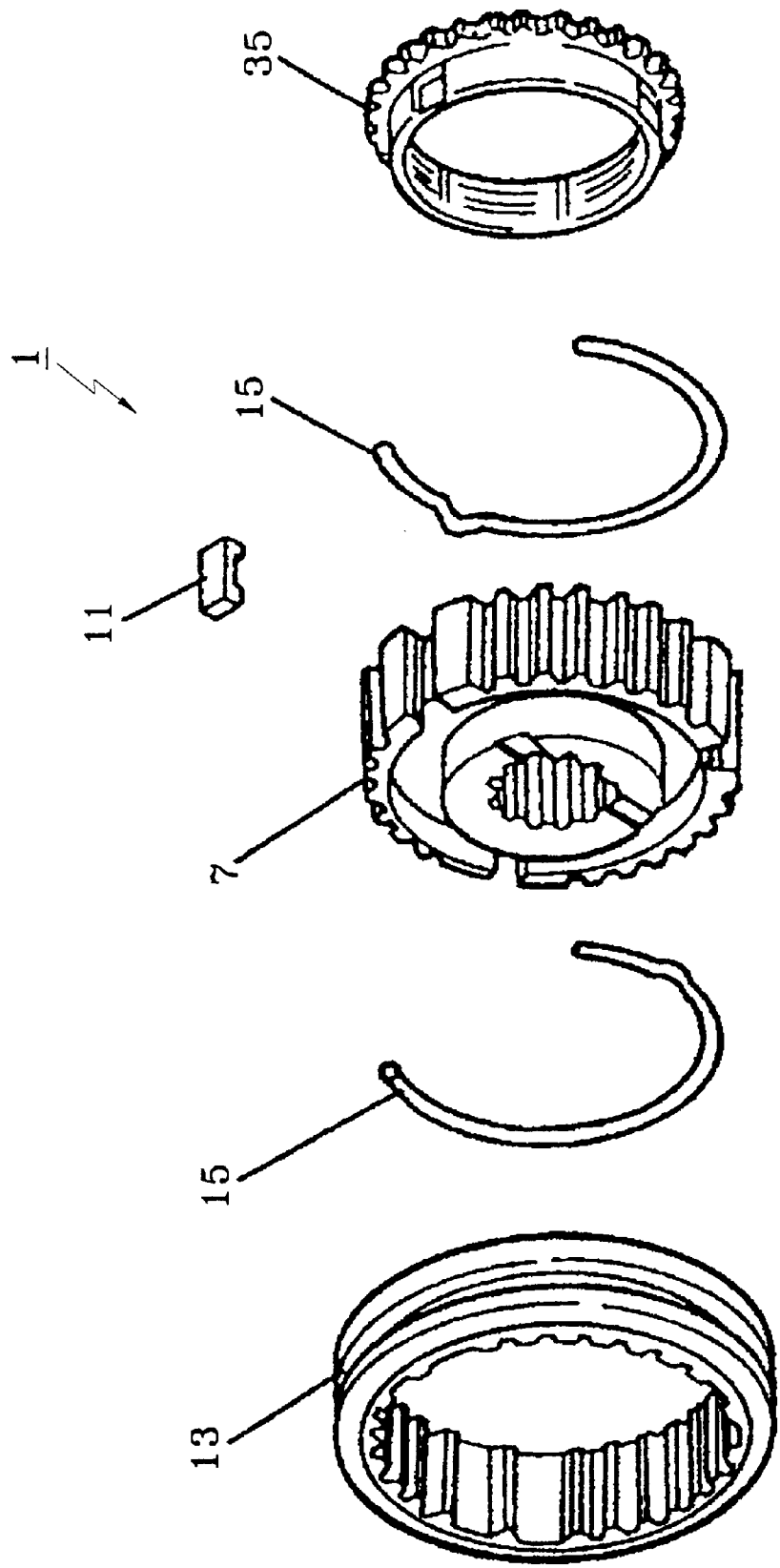
FIG. 1 is a perspective view for illustrating a general manual transmission.
Figure 2:
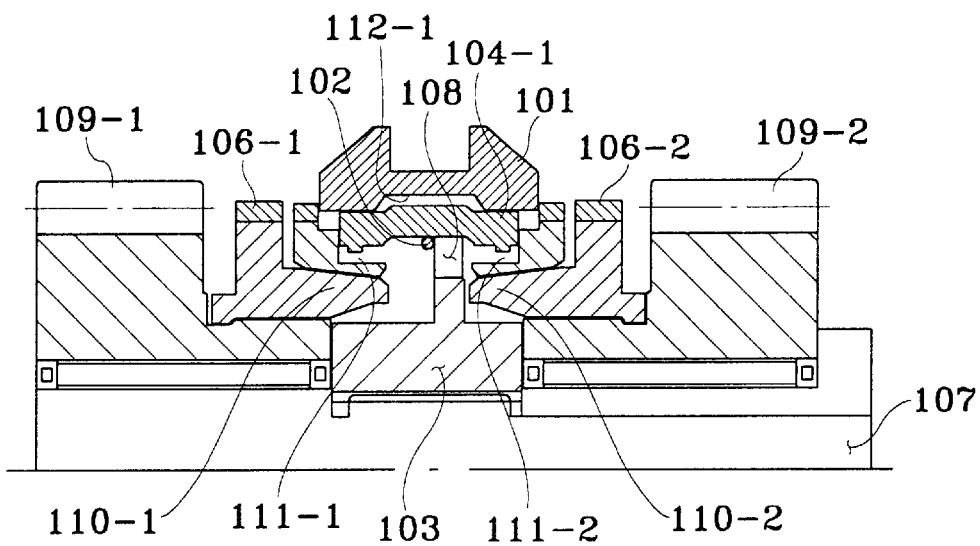
FIG. 2 is a cross-sectional view for illustrating a part where a first key set is installed in a dual synchronization system of a manual transmission in accordance with the present invention.
Figure 3:
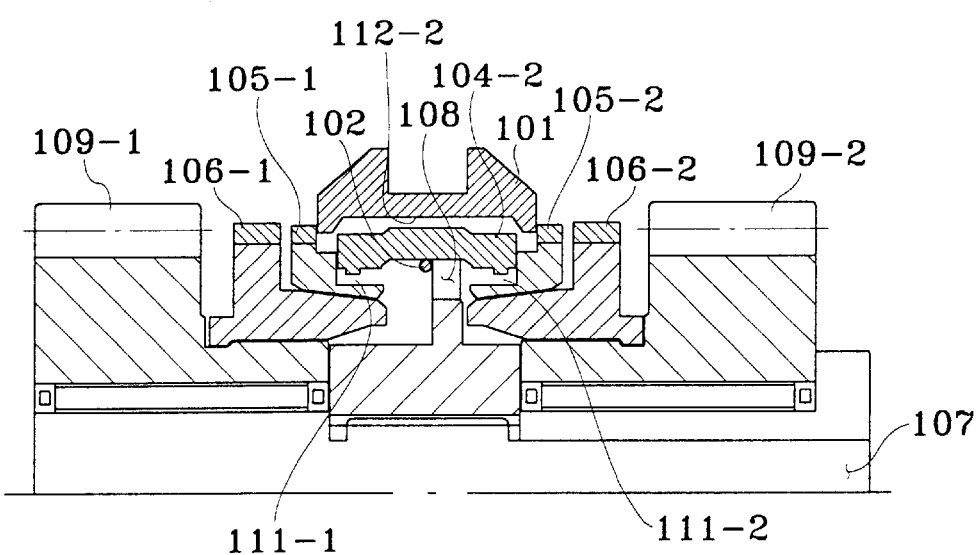
FIG. 3 is a cross-sectional view for illustrating a part where a second key set is installed in a dual synchronization system of a manual transmission in accordance with the present invention.
Figure 4:
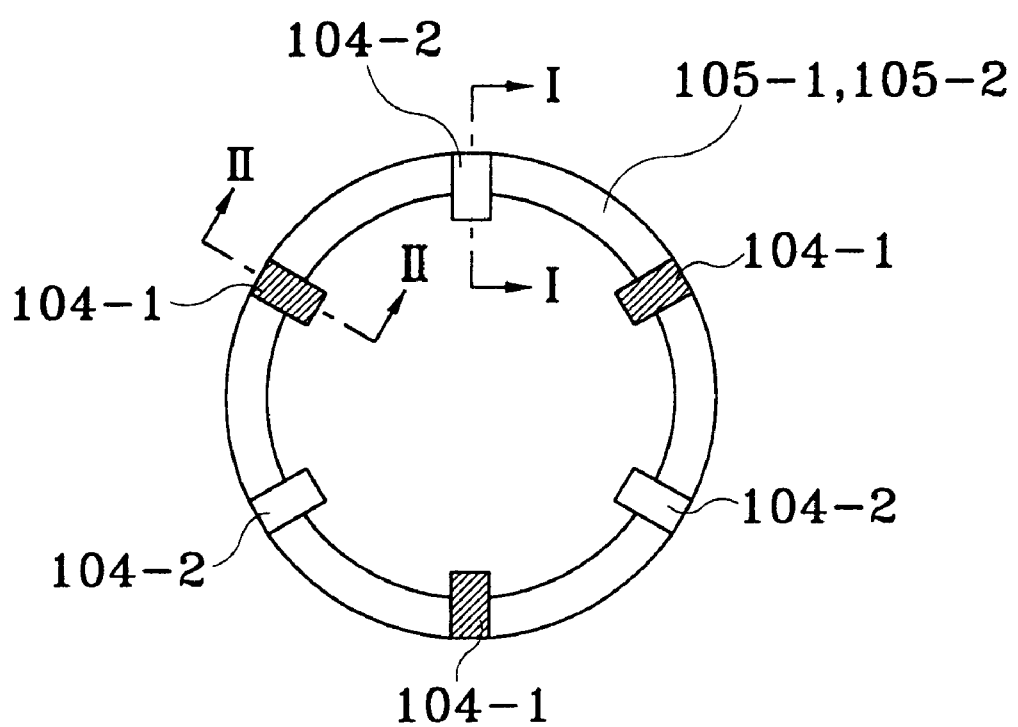
FIG. 4 is a layout view for illustrating the arrangement of a synchronizer ring and the first and second key sets of a manual transmission in accordance with the present invention.
Figure 5:
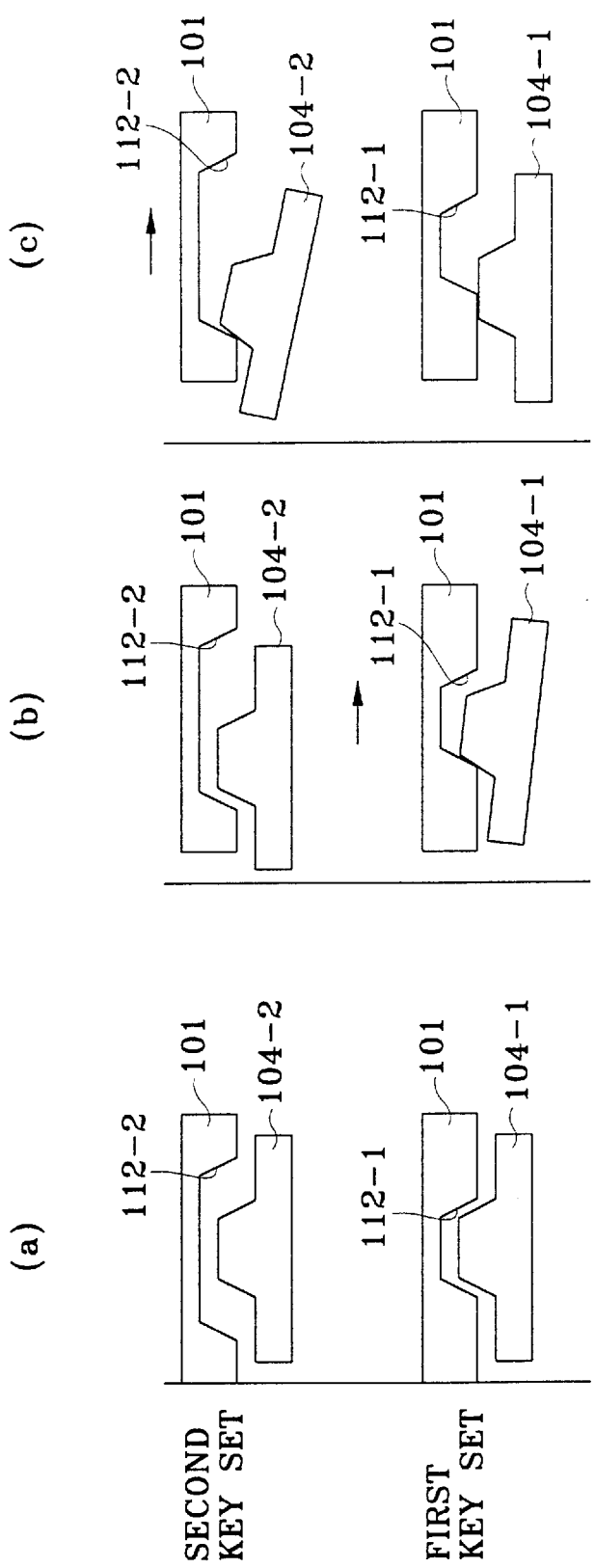
FIG. 5 is a conceptual view for illustrating operations of the present invention.

FIG. 2 is a cross-sectional view for illustrating a part where a first key set is installed in a dual synchronization system of a manual transmission in accordance with the present invention, relating to the cross-sectional view cut along line II—II shown in FIG. 4. FIG. 3 is a cross-sectional view for illustrating a part where a second key set is installed in a dual synchronization system of a manual transmission in accordance with the present invention, relating to the cross-sectional view cut along line III—III shown in FIG. 4. FIG. 4 is a layout view for illustrating the arrangement of a synchronizer ring and the first and second key sets of a manual transmission in accordance with the present invention, and FIG. 5 is a conceptual view for illustrating operations of the present invention.

As shown in the drawings, a dual synchronization system of the manual transmission is constructed with synchronizer sleeve 101, synchronizer spring 102, synchronizer hub 103, first key set 104-1, second key set 104-2 and synchronizer rings 105-1, 105-2, and the operations of the dual synchronization system makes it possible to overcome a difference of rotational speeds between the synchronizer hub 103 and clutch gears 106-1, 106-2 for connection or disconnection therebetween.

In other words, the main axle 107 of the clutch gear is installed to mesh the synchronizer hub 103 along spline for simultaneous rotations. A plurality of grooves 108 are radially formed at the external circumference of the synchronizer hub 103 for respectively arranging three keys of the first and second key sets at the interval of 120 degrees. Outside of the plurality of grooves 108, the synchronizer sleeve 101 is coupled for moving to the direction of the axle. The keys of the first and second key sets 104-1, 104-2 are closely attached and supported at the internal side of the synchronizer sleeve 101 by the synchronizer spring 102.

On the other hand, as shown in FIGS. 2 and 3, speed gears 109-1, 109-2 are arranged at both sides of the synchronizer sleeve 101 without rotational interference of the main axle 107 for forming respective shifts, and the clutch gears 106-1, 106-2 having cone parts 110-1, 110-2 are integrally formed at one side of the speed gears 109-1, 109-2 for performing a synchronization by the friction generated by getting the synchronizer rings 105-1, 105-2 in contact with the cone parts 110-1, 110-2.

At this time, the synchronization means that the synchronizer rings 105-1,105-2 and clutch gears 106-1, 106-2 get to a state where they integrally rotate at an identical level of speed from another state where not at different levels of speed.

In addition, the synchronizer rings 105-1, 105-2 have screw parts at their internal sides for increasing friction with the cone parts 110-1, 110-2 and a plurality of slots 111-1, 111-2 at the external sides for getting the ends of the keys of the first and second key sets 104-1, 104-2 positioned along the circumference thereof.

At this time, the keys of the first and second key sets 104-1, 104-2 are alternatively arranged at a predetermined equal interval along the circumferential direction of the synchronizer rings 105-1, 105-2. In the preferred embodiment of the present invention, three keys of the first and second key sets are respectively arranged as shown in FIG. 4.

Therefore, those keys of the first and second key sets are installed at an angular interval of 120 degrees.

On the other hand, a difference between FIGS. 2 and 3 is in that a concave part 112-2 at lower side of the synchronizer sleeve corresponding to the keys of the second key set 104-2 is formed longer than that 112-1 at the lower side of the synchronizer sleeve corresponding to the keys of the first key set 104-1. Like this, if there is a difference in the length of the concave parts of the synchronizer sleeve 101, when the synchronizer sleeve 101 moves to the axle, the keys of the first and second key sets 104-1, 104-2 are also moved to the axle by the synchronizer sleeve 101 at different points of time to thereby push the synchronizer rings 105-1, 105-2 toward the cone parts 110-1, 110-2 of the clutch gears 106-1, 106-2.

Operations of the synchronization system thus constructed will be described below. Speed gears 109-1, 109-2, clutch gears 106-1, 106-2 and synchronizer rings 105-1, 105-2 are respectively assembled at both sides of the synchronizer sleeves 101 for forming different shifts, so as to make it possible to switch to a different shift level according to the operational direction of the synchronizer sleeve 101. Hereinafter, for conveniences, the description will be made only about how shifting operations are made when the synchronizer sleeve 101 moving to the left functions with the speed gears 109-1, clutch gear 106-1 and synchronizer ring 105-1 positioned at the left side of the drawing.

When a driver manipulates a shift lever, the synchronizer sleeve 101 moves along the axial direction on the synchronizer hub 103. At this time, the synchronizer sleeve 101 is pushed close to the cone part 110-1 of the clutch gear 106-1 connected to the speed gear 109-1 of a desired shift when the keys of the first and second key sets 104-1, 104-2 are pushed to the lateral wall of the synchronizer ring 105-1.

At this time, a mechanism where the synchronizer sleeve 101 moves the keys is as follows: if the protruded part of keys positioned to the internal side of the concave parts 112-1, 112-2 of the synchronizer sleeve 101 is pushed to the axial direction by the lateral wall of the concave parts 112-1, 112-2 to the point, where the keys cannot be pushed any longer, the keys transform the synchronizer spring 102 and are pushed to the internal side of the synchronizer sleeve 101, allowing the continuous procession of the synchronizer sleeve 101.

As shown in the preferred embodiment of the present invention in FIG. 5, the operations of the mechanism described above will be separately performed at keys of the first and second key sets 104-1, 104-2, and the aforementioned operations will be started one by one, respectively at the initiation and completion of synchronization.

In other words, when the synchronizer sleeve 101 starts being moved at the initiation of synchronization, the keys of the first key set 104-1 just like those of the prior art play a role to eliminate the difference in the rotational speeds of the synchronizer ring 105-1 and clutch gear 106-1 by pushing the synchronizer ring 105-1 to the clutch gear 106-1 by the lateral wall of the concave part 112-1, and those of the second key set 104-2 function after completion of synchronization, as described above, that is, when the synchronizer sleeve 101 pushes the keys of the first key set 104-1 away to the internal side. As the concave part 112-2 at the internal side of the synchronizer sleeve 101 corresponding to the keys of the second key set 104-2 is longer than that 112-1 corresponding to the keys of the first key set 104-1, the lateral wall of the concave part 112-2 starts to get in contact with the keys of the second key set 104-2 when the keys of the first key set 104-1 starts to be pushed inwards and the keys of the second key set 104-2 push the synchronizer ring 105-1 close to the clutch gear 106-1 until the synchronizer sleeve 101 begins to be meshed with the clutch gear 106-1, thereby continuously keeping the operational state of synchronization.

Therefore, the synchronizer sleeve 101 starts to be moved by a driver's manipulation of the shift lever and maintains the stable state of synchronization by pushing the synchronizer ring 105-1 close to the clutch gear 106-1 from the initiation of synchronization when the synchronizer ring 105-1 starts to be put close to the clutch gear 106-1, until the completion of synchronization when the synchronizer ring 105-1 gets to the same rotational speed as the clutch gear 106-1 and to the point of time when the synchronizer sleeve 101 is meshed with the clutch gear 106-1, so as to prevent the breakdown of synchronization and improve shifting feelings with the stable shifting operations once the synchronization has been achieved.

As described above, there is an advantage in the dual synchronization system of the present invention in that the keys of the system are made in a dual system to continuously maintain the once-formed state of synchronization, thereby achieving stable shifting operations and better shifting feelings of the manual transmission.

What is claimed is:

1. A dual synchronization system of a manual transmission constructed with first and second key sets respectively having a plurality of keys that are apart at a predetermined degree of angle along the circumferential direction of a synchronizer ring, the first key set closely attaching the synchronizer ring to a clutch gear at the initiation of synchronization and the second key set pushing the synchronizer ring to the clutch gear after the completion of synchronization, thereby continuously maintaining the frictional force between the synchronizer ring and the clutch gear.

2. The system, as defined in claim 1, wherein the keys of the first and second key sets are alternatively arranged along the circumferential direction of the synchronizer rings.

3. The system, as defined in claim 2, wherein the keys of the first and second key sets are arranged at a predetermined identical interval.

4. The system, as defined in claim 3, wherein there are more than 3 keys, at least, of the first and second key sets respectively.

5. The system, as defined in claim 1, wherein the keys of the first and second key sets are respectively positioned apart at the angle of 120 degrees at least.

6. The system, as defined in claim 1, wherein the concave part at lower side of the synchronizer sleeve corresponding to the keys of the second key set is formed longer than that positioned at the lower side of the synchronizer sleeve corresponding to the keys of the first key set.

* * * * *